C. TAYLOR.
PNEUMATIC TIRE PROTECTOR.
APPLICATION FILED DEC. 27, 1921.
1,420,392.
Patented June 20, 1922.
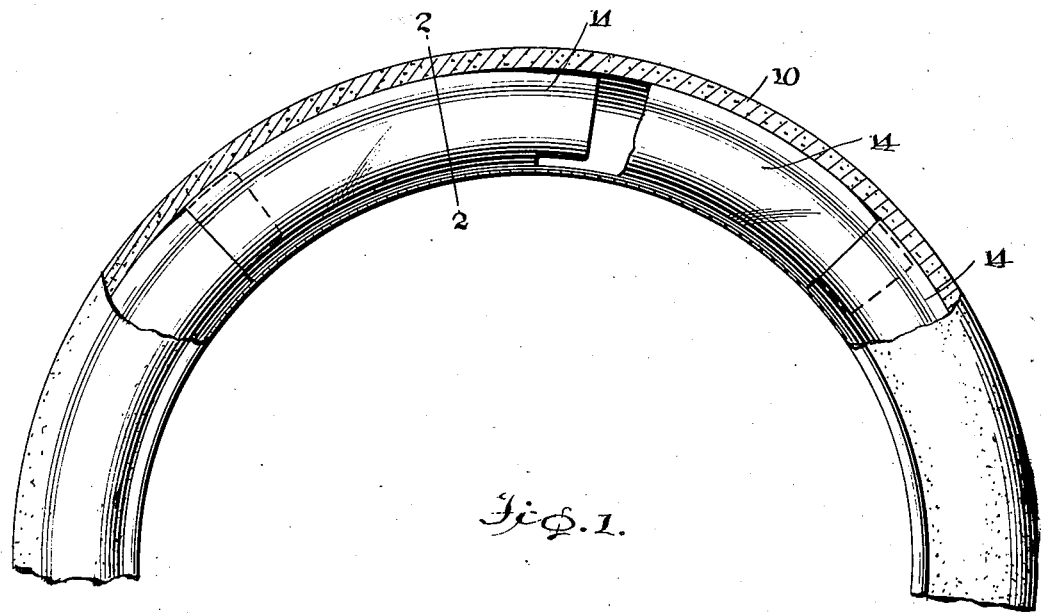
Fig. 1.
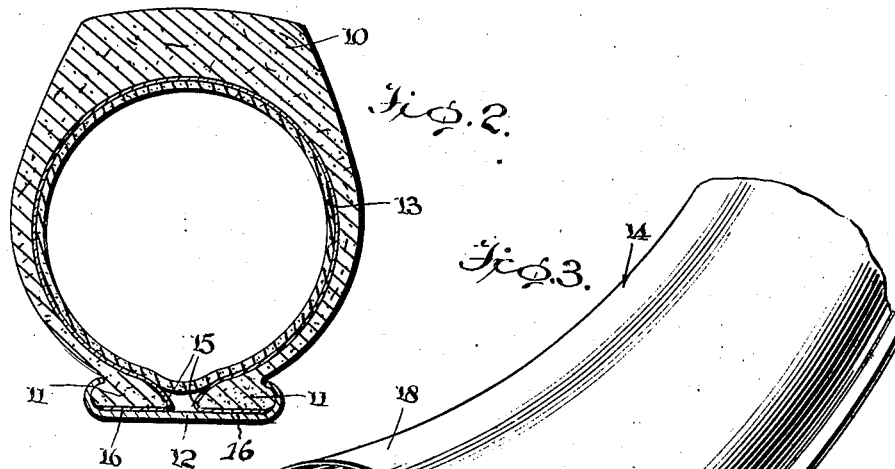
Fig. 2.
Fig. 3.
WITNESSES
INVENTOR
Clarence Taylor,
BY
ATTORNEYS

UNITED STATES PATENT OFFICE.

CLARENCE TAYLOR, OF NEWPORT, RHODE ISLAND.

PNEUMATIC TIRE PROTECTOR.

1,420,392.

Specification of Letters Patent.   Patented June 20, 1922.

Application filed December 27, 1921. Serial No. 524,940.

*To all whom it may concern:*

Be it known that I, CLARENCE TAYLOR, a citizen of the United States, and a resident of Newport, in the county of Newport and State of Rhode Island, have invented certain new and useful Improvements in Pneumatic-Tire Protectors, of which the following is a specification.

This invention relates to a pneumatic tire protector and more particularly to a puncture shield for the inner tubes of pneumatic tires.

The object of the invention is to provide a suitable shield which may be interposed between the outer casing of a pneumatic tire and the inner tube thereof and which will be adapted to protect the inner tube from puncture.

It is also an object of the invention that the shield be adapted to yield with the pressure exerted upon the outer casing and not perceptibly decrease the resiliency of a pneumatic tire with which the same may be associated.

A further object of the invention is that the shield be extremely simple in construction and inexpensive to manufacture.

Other objects will hereinafter appear in the detailed description to follow.

The invention is illustrated by way of example in the accompanying drawings, in which:—

Figure 1 is a view in side elevation of a portion of a pneumatic tire with parts thereof broken away and shown in section to clearly illustrate the application of the present invention, Figure 2 is a vertical sectional view taken substantially on the line 2—2 of Figure 1, Figure 3 is a perspective view of a portion of one of the sleeve sections for forming the shield of the inner tube.

Referring to the drawings more particularly, 10 indicates generally the outer casing of a pneumatic tire which is provided at its outer edges with the usual beads 11, said beads being retained in the rims 12, and within the casing there is disposed the usual inner tube 13.

In carrying out the present invention, I provide a number of sleeve sections 14 which are preferably made with a light sheet metal and the outer periphery of which are complemental to the inner periphery of the tire casing 10. Each sleeve section 14 is split or divided similarly to the tire casing 13 and the contiguous edges so formed are each provided with an outwardly extending lip 16, which when a sleeve section is positioned within the outer tire casing, as shown in Figure 2, is adapted to fit beneath the associated bead 11 of the tire casing and thus afford a means for holding the different sleeve sections in position.

One end of each sleeve portion existing along each contiguous edge 15 is cut away, as shown at 17 in Figure 3, while at the other end of each sleeve the lips 16 extend flush therewith.

In the use of the present invention a plurality of sleeve sections 14 are arranged within the casing 10 so that the same will extend entirely thereabout, and the end portion 18 of each sleeve section is telescoped by the abutting end of the adjacent sleeve section as indicated in dotted lines in Figure 1, thus forming a flexible and contiguous shield for the inner tire 13 as illustrated.

It may be mentioned that it is also an advantage in having a shield divided in sections when it is desired to remove a portion of the same. Also in case one shield should be broken the same may be easily replaced without great expense.

I claim:

A tire shield of the character described, comprising a plurality of arcuate shaped sleeve sections adapted to form a ring when assembled together, each sleeve being split longitudinally upon its inner periphery and the contiguous edges so formed, each being provided with a lip or flange, and the lips of each sleeve terminating a predetermined distance from one end thereof whereby the succeeding sleeves may telescope each other and then be against further telescopic movement with respect to each other.

CLARENCE TAYLOR.